(No Model.)
A. McDUFF & J. MRAZEK.
DEVICE FOR TESTING CRANK PINS.
No. 437,225.  Patented Sept. 30, 1890.
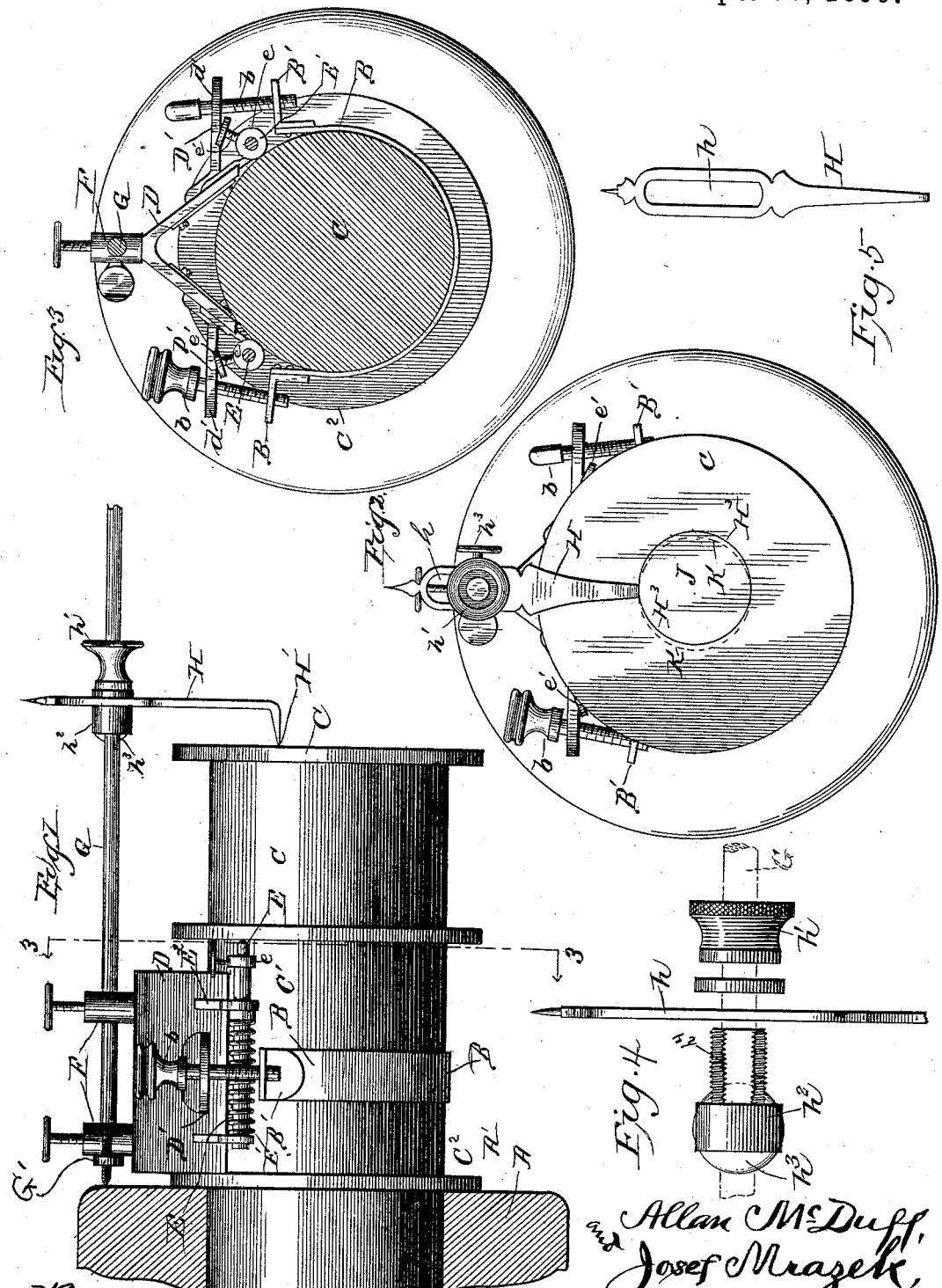

UNITED STATES PATENT OFFICE.

ALLAN McDUFF AND JOSEF MRAZEK, OF CEDAR RAPIDS, IOWA.

DEVICE FOR TESTING CRANK-PINS.

SPECIFICATION forming part of Letters Patent No. 437,225, dated September 30, 1890.

Application filed October 5, 1889. Serial No. 326,121. (No model.)

*To all whom it may concern:*

Be it known that we, ALLAN McDUFF and JOSEF MRAZEK, citizens of the United States, residing at Cedar Rapids, in the county of Linn and State of Iowa, have invented a certain new and useful Tool for Testing Crank-Pins of Locomotives and Engines, of which the following is a specification.

The object of our invention is to obtain a device whereby the crank-pin of a locomotive or the crank-pin of a stationary or other engine may be tested without removing such crank-pin from the driving-wheel, disk, or crank-shaft to which it is secured, in order to determine if the crank-pin be at right angles with the face of the driving-wheel crank-pin hub or the face of the disk or crank, to determine whether the crank-pin is parallel with the driving-axle or crank-shaft, and, further, to determine whether the journal of the crank-pin is eccentric with the center of such crank-pin.

We have illustrated our invention by the drawings forming a part hereof, in which—

Figure 1 is a side elevation of a crank-pin with our device mounted thereon in a manner permitting its use. Fig. 2 is a front elevation of a crank-pin, showing our device in end elevation mounted thereon. Fig. 3 is a cross-section on line 3 3 of Fig. 1, viewed in the direction of the arrows. Fig. 4 is a detached view of the scriber, the rod upon which it is mounted, and the several connecting parts; and Fig. 5 is a front view of the scriber, showing a slot therein by which it is adjusted.

Like letters refer to like parts throughout the several views.

A is a section of a driving-wheel, and A' is the face of the driving-wheel crank-pin hub.

B is a flexible metal band, preferably of polished steel, extending around the crank-pin from the base upon which the several parts of the device are mounted. This flexible band may be adjusted by the set-screws $b\ b$, which fit loosely in holes in the wings extending out from the base of the device, and which fit closely into threaded holes in pieces B' B', rigidly secured to each end of the flexible band. By means of this flexible metal band adjusted as described the device is mounted on the crank-pin and revolubly secured in place thereon.

C is the crank-pin, upon which the device is illustrated as mounted for the purpose of testing such crank-pin. C' is the crank-pin journal. $C^2$ is the crank-pin collar.

D is the base or foundation, V-shaped upon the face thereof, which comes in contact with the crank-pin when the device is mounted in place for the purpose of testing such crank-pin, on which the several adjustable parts of the device are secured. As hereinbefore stated, this V-shaped base D is in contact with the crank-pin upon the journal C' thereof when such crank-pin is being tested, and is held closely thereto by the set-screws $b\ b$, adjusting the flexible band B, so that proper tension is attained in such flexible band. While this V-shaped base D is thus held in contact with the crank-pin journal it, with all the parts supported thereby, may be turned around such crank-pin journal. The wings to such base D, hereinbefore mentioned, are lettered D' D', and the holes therein, through which set-screws $b\ b$ pass, fitting loosely, are lettered $d'\ d'$.

E is a tension-bar having mounted thereon tension-spring E'. This tension-bar E slides freely in journals $E^2$, which are rigidly secured to the V-shaped base D, and serves to hold such V-shaped base firmly against crank-collar $C^2$. The device is constructed with two of these tension-bars E, as will be noted by reference to the drawings, Fig. 3. On each of the tension-bars E there is rigidly mounted a collar (lettered $e$) having a set-screw $e'$ therein, and extending entirely through the tension-bar E is the adjustable sliding rod $e^2$, which is secured in any desired position by set-screw $e'$.

F F are guides in which an adjusting-rod G freely slides.

G' is an arm rigidly attached to the inner end of rod G, and $g$ is an adjustable screw-point movable in arm G'. When the device is in use, this point $g$ may be set against the face of the crank-pin hub A'.

H is a scriber having the point H', adapted to be adjusted on rod G, so as to inscribe a mark upon the end of the crank-pin C, as is illustrated in Fig. 2. $H^3$ is such circle or mark inscribed upon the end of the crank-pin by the scriber-point H'. In order to adjust this scriber H on the rod G, so that the point H' may describe or mark circle H³ upon the end of the crank-pin C of the desired size, as the whole device, inclusive of the base, is turned around the crank-pin upon which it is so mounted, there is provided the slot $h$ in the scriber and set-screw $h'$ mounted on the collar $h^2$. The collar $h^2$ may be slid on the rod G to any desired place, and there clamped by set-screw $h^3$.

$h^4$ is a shoulder on collar $h^2$, against which the slot $h$ fits.

J is the center of the crank-pin C, and K is a circle inscribed with a pair of common calipers around such center.

In testing a crank-pin for the purpose of determining if such crank-pin be at right angles with the face of the driving-wheel crank-pin hub the operation of our device is as follows: The set-screw $g$ in the arm G' at the inner end of the adjusting-rod G is adjusted so that the point of the set-screw will nearly touch or come in contact with the face of the crank-pin hub A'. The device is then revolved around the crank-pin journal C', and an inspection of the variation, if any, between the face of the crank-pin hub and the point of the set-screw while such revolution of the device is being made will determine if the crank-pin is at right angles with the face of the crank-pin hub. In this operation the point of the set-screw $g$ forms a scriber.

In testing a crank-pin for the purpose of determining if such crank-pin or the axis thereof is parallel with the driving-axle or crank-shaft, the operation of the device is: First determine in the manner last described if the crank-pin be at right angles with the face of the driving-wheel crank-pin hub, and if a variation is found correct the variation of the crank-pin until such variation disappears. Then set the point H² of scriber H upon the outside collar of the crank-pin, as illustrated in Fig. 1. The device is then revolved around the crank-pin, as before, and by inspection of the point H² of the scriber H on the collar of the crank-pin and of the point of the set-screw $g$ on the face A' of the pin-hub it will be found that if both positions of the crank-pin are correct the point H² of the scriber will run parallel with the collar of the crank-pin, and the point of the set-screw $g$ will run parallel with the face of the crank-pin hub.

In testing a crank-pin with our device for the purpose of determining if the journal thereof is eccentric or not with the axis of the crank-pin, the operation of the device is: Find the center of the crank-pin at the end thereof from the outside of the crank-pin collar with a pair of suitable calipers, and then with a pair of dividers scribe a circle on the end of the crank-pin. Such circle is shown on the drawings, Fig. 2, (lettered K.) The bent end H' of the scriber H is then set on the circle K so as to touch the circle upon some point thereof, and by revolving our device around the crank-pin journal a second circle is inscribed upon the end of the crank-pin. If the two circles are coincident the journal of the crank-pin is not eccentric with the axis thereof; but if such circles are not coincident such crank-pin journal is eccentric with its axis, and a comparison of the two circles will determine the extent of such eccentricity. In actual practice with our device we have found a variation amounting at times to more than one-sixteenth of an inch.

Having thus described our invention and its method of operation, what we claim, and desire to secure by Letters Patent of the United States, is—

1. In a device for testing the crank-pin of a locomotive or engine, the combination of a V-shaped base, standards mounted thereon, an adjustable rod sliding in such standards, and an adjustable marking-point or scriber on the inner end of such adjustable sliding rod, substantially as described.

2. In a device for testing the crank-pin of a locomotive or engine, the combination of a V-shaped base, flexible metal bands adjustably secured to the base and adapted to rotatably secure such base to the crank-pin, standards on the base, an adjustable sliding rod moving in such standards, and an adjustable scriber on the inner end of such adjustable sliding rod, substantially as described.

3. In a device for testing the crank-pin of a locomotive or engine, the combination of a V-shaped base, flexible metal bands adjustably secured to the base and adapted to rotatably secure such base to the crank-pin, standards on the base, having an adjustable sliding rod therein, a scriber on the inner end of such adjustable rod, and an adjustable scriber on the outer end of such sliding rod, adapted to scribe a circle on the face of the collar of the crank-pin as the device is rotated around such crank-pin, all substantially as described.

4. In a device for testing the crank-pin of a locomotive or engine, the combination of a V-shaped base having standards thereon, flexible metal bands adjustably secured to the base and adapted to rotatably secure such base to the crank-pin, an adjustable rod sliding in the standards on the base, a scriber on the inner end of such adjustable sliding rod, and an adjustable scriber mounted on the outer end of the sliding rod and adapted to scribe a circle on the end of the crank-pin as such device is rotated around it, substantially as described.

5. In a device for testing the crank-pin of a locomotive or engine, the combination of a V-shaped base, flexible metal bands adjustably secured to the base and adapted to rotatably secure such base to the crank-pin, standards on the base, through which adjustably moves a sliding rod having adjustable scribers at each end thereof, a tension-bar sliding freely in journals secured to the V-shaped base, and a spring surrounding the tension-bar, one end of the spring abutting against one of the journals and the other end of the spring abutting against a shoulder on the tension-bar, such adjustable rod extending through the tension-bar and adapted to be rigidly secured at any desired point in the tension-bar by a set-screw thereon, whereby when the V-shaped base is rotatably mounted upon the journal of the crank-pin of the locomotive or engine the scriber upon the inner end of the adjustable rod is held in contact with the face of the driving-wheel crank-pin hub, substantially as described.

ALLAN McDUFF.
JOSEF MRAZEK.

Witnesses:
JAMES LAWLER,
W. A. ROBERTSON.